W. M. Caree.
Hand Seeder.
Nº 30,308.  Patented Oct. 9, 1860.
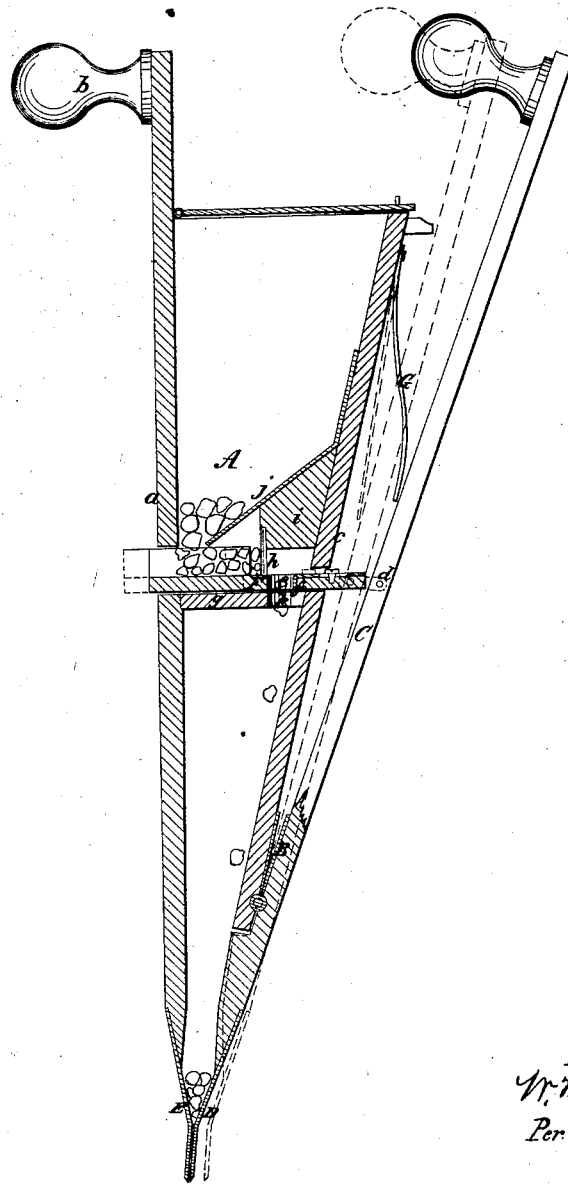
Witnesses.
J. W. Coombs.
O. Hughes.
Inventor.
W. M. Caree.
Per Munn & Co.
Attorneys.

UNITED STATES PATENT OFFICE.

WILLIAM M. GAREE, OF COX, OHIO.

IMPROVEMENT IN SEEDING-MACHINES.

Specification forming part of Letters Patent No. 30,308, dated October 9, 1860.

*To all whom it may concern:*

Be it known that I, WILLIAM M. GAREE, of Cox, in the county of Licking and State of Ohio, have invented a new and useful Improvement in Seeding-Machines; and I do hereby declare that the following is a full, clear, and exact description of the same, reference being had to the annexed drawing, making a part of this specification, said drawing being a vertical section of my invention.

This invention relates to that class of machines which are operated manually and carried in the hands of the operator, and is an improvement on a machine formerly patented by me, the Letters Patent bearing date March 6, 1860. In this aforesaid-patented machine, as well as in many others of the same class, there is a hinged board by which the seed-slide is operated and the movable jaw opened. These boards have hitherto, so far as I am aware, been operated exclusively by hand, requiring considerable attention and rendering the manipulation quite laborious.

A represents a V-shaped box, one side, $a$, of which extends up higher than the other, and has a handle, $b$, attached. To the lower end of the box A, at the side $c$, opposite to $a$, there is attached, by a spring, B, a board, C. This board C extends down below the side $c$, and it has a metal jaw, D, attached to it, which corresponds in form with a jaw, E, attached to the lower end of the side $a$. The spring B has a tendency to keep the jaws D E in contact and the lower end of the box A in a closed state, the sides of the box at right angles to $a\ c$ being arranged in the usual way, or as shown in my patented machine previously alluded to.

To the board C a seed-slide, F, is attached by a joint, $d$. This slide passes into the box A, and it is provided with a hole, $e$, the capacity of which may be regulated as desired by an adjustable plate, $f$. The slide F works on a partition-plate, $g$, in the box, and below a cut-off brush, $h$, to the block $i$ of which an inclined metal plate, $j$, is attached, said plate extending downward and some distance beyond the cut-off brush $h$, as shown clearly in the drawing. There is an opening, $k$, in the partition-plate $g$, said opening being below the brush-block $i$.

The operation is as follows: The seed to be planted is placed in the upper part of the box A, above the plate $j$ and partition-plate $g$. When the jaws D E are in contact the operator presses them into the earth at the place where seed is to be deposited, and then shoves the board C toward the box A, the jaw D being thereby shoved out from the jaw E, and the seed which was contained by the jaws is deposited in the hole made in the earth by distending them. As the board C is thus moved the slide F is shoved inward past the cut-off brush $h$ and the hole $e$ is filled with seed, the filling of the hole $e$ and the dropping of the seed held by the jaws being simultaneous. The board C being then relieved of the pressure of the hand of the operator, the spring B moves it outward from the box A and the jaw D closes against E, the slide F being at the same time drawn outward and past the brush $h$, so that the hole $e$ may discharge its seed through the opening $k$, the seed being caught by the closed jaws and retained until they are again distended for a succeeding planting operation.

The spring B, when not restrained, keeps the jaws in a closed state and prevents the casual escape of seed from the machine, and the inclined plate $j$ prevents too great a pressure of the seed on the slide F and enables the latter to work with but little friction, and at the same time insures a regular or uniform quantity of seed in each dropping.

Having thus described my invention, what I claim as new, and desire to secure by Letters Patent, is—

The arrangement of the spring B, jaws D E, and board C with the slide F, box A, guard-plate $j$, and brush $h$, all as herein set forth and described, for the purposes set forth.

WILLIAM M. GAREE.

Witnesses:
R. F. BRYDON,
M. WATKINS.